United States Patent
Yasunishi et al.

[11] Patent Number: 6,069,104
[45] Date of Patent: May 30, 2000

[54] MICROWAVE DIELECTRIC PORCELAIN COMPOSITION

[75] Inventors: Yuji Yasunishi; Kazuhisa Itakura, both of Ise, Japan

[73] Assignee: NGK Spark Plug Co., Ltd., Aichi, Japan

[21] Appl. No.: 09/332,033

[22] Filed: Jun. 14, 1999

[30]       Foreign Application Priority Data

Jun. 12, 1998  [JP]  Japan ................................. 10-181496
Feb. 18, 1999  [JP]  Japan ................................. 11-040540

[51] Int. Cl.[7] ...................... C04B 35/457; C04B 35/465; H01P 7/10
[52] U.S. Cl. ......................... 501/136; 333/219.1
[58] Field of Search ........................ 501/136; 333/219.1

[56]             References Cited

FOREIGN PATENT DOCUMENTS

7-201223  8/1995  Japan .
8-231269  9/1996  Japan .

*Primary Examiner*—David Brunsman
*Attorney, Agent, or Firm*—Sughrue, Mion, Zinn, Macpeak & Seas, PLLC

[57]             ABSTRACT

A microwave dielectric porcelain composition having a composition represented by the formula $xTiO_2$-$ySnO_2$-$zMgO$, wherein x, y and z each represents an axis of mol-% in a triangular diagram, the sum of x, y and z being 100 mol-%, a pentagonal region is formed by sequentially connecting points P (x=59, y=11, z=30 ), Q (x=63, y=11, z=26), R (x=22.5, y=77.5, z=0), S (x=2, y=98, z=0), T (x=4, y=90, z=6) and P, and the formula is defined to be within the PQ, QR, ST and TP sides, but not defined by the RS side, of the pentagonal region.

12 Claims, 5 Drawing Sheets

MICROWAVE DIELECTRIC PORCELAIN COMPOSITION

FIELD OF THE INVENTION

The present invention relates to a microwave dielectric porcelain composition (hereinafter referred to as "dielectric porcelain composition") having a specific composition. The dielectric porcelain composition of the present invention can be used as dielectric resonator, dielectric filter or other components in microwave range as well as microwave integrated circuit board, impedance matching member for various microwave circuits or the like.

BACKGROUND OF THE INVENTION

A dielectric porcelain composition tends to exhibit a greater dielectric loss as the frequency used increases. Therefore, a dielectric porcelain composition having a great dielectric constant (hereinafter referred to as "$\in_r$") and a great unloaded Q value (hereinafter referred to as "$Q_u$") in microwave range has been desired. Further, a dielectric porcelain composition having a small resonance frequency temperature coefficient (hereinafter referred to as "$\tau_f$") as well as good $\in_r$, $Q_u$ and $\tau_f$ values has been required.

As such a dielectric porcelain composition there is disclosed a composition comprising MgO, $TiO_2$ and $SnO_2$ in JP-A-8-231269 (The term "JP-A" as used herein means an "unexamined published Japanese patent application"). The proposed dielectric porcelain composition comprises a small amount of $SnO_2$ incorporated therein and allegedly exhibits a high Q value as compared with the conventional materials. However, no reference is made to $\tau_f$. Further, JP-A-7-201223 discloses a dielectric porcelain composition comprising $TiO_2$ and a relatively large amount of $SnO_2$. This composition exhibits excellent $\in_r$ and $Q_u$ values. However, the dielectric porcelain composition comprising two components can difficultly have its dielectric properties adjusted as desired by changing the formulation. In particular, no products having an excellent $\tau_f$ value, i.e., around 0 ppm/°C. can be obtained unless the composition has a high $SnO_2$ proportion.

SUMMARY OF THE INVENTION

The present invention provides solution to the foregoing problems of the related art.

It is therefore an object of the present invention to provide a dielectric porcelain composition having excellent $\tau_r$, $Q_u$ and $\tau_f$ values in combination.

It is another object of the present invention to provide a dielectric porcelain composition which can exhibit a sufficient $Q_u$ value even when used in the form of large-sized resonator.

In particular, the dielectric porcelain composition of the present invention can have its $\tau_f$ value properly adjusted at a specific $\in_r$ value while maintaining a practically sufficient $Q_u$ value. Further, the dielectric porcelain composition of the present invention can have its $\tau_f$ value adjusted to around 0 ppm/°C. over a wide range of $\in_r$ value.

Figure 1:
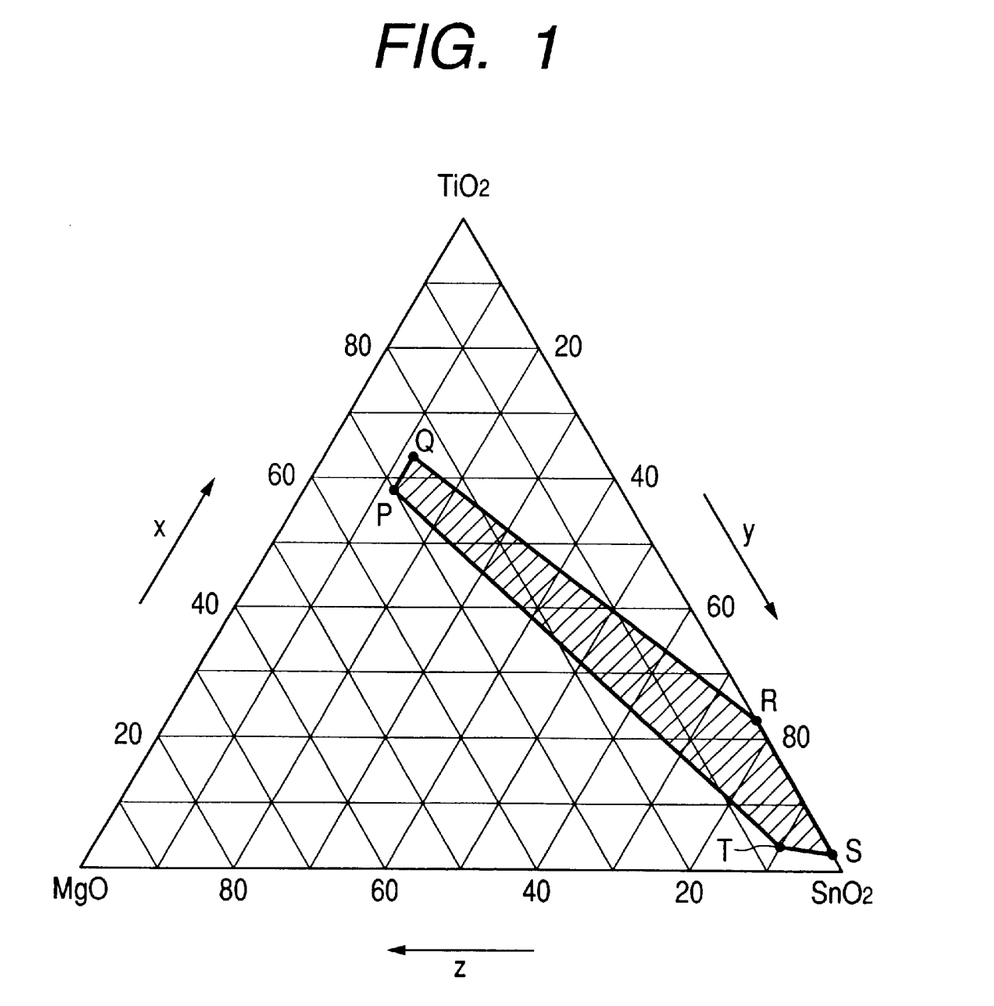
FIG. 1 is a composition chart of components constituting the dielectric porcelain composition according to the first aspect of the present invention and the dielectric porcelain composition according to the second aspect of the present invention.

A first aspect of the present invention concerns a microwave dielectric porcelain composition having a composition represented by the formula $xTiO_2$-$ySnO_2$-$zMgO$ (wherein x, y and z each represent mol-%, with the proviso that the sum of x, y and z is 100), characterized in that x, y and z lie within a pentagonal region formed by sequentially connecting points P (x=59, y=11, z=30), Q (x=63, y=11, z=26), R (x=22.5, y=77.5, z=0), S (x=2, y=98, z=0), T (x=4, y=90, z=6) and P in FIG. 1, with the proviso that the pentagonal region contains sides PQ, QR, ST and TP but side RS.

A second aspect of the present invention concerns a dielectric porcelain composition comprising a component represented by the formula $xTiO_2$-$ySnO_2$-$zMgO$ as defined above and $MnO_2$, characterized in that the content of $MnO_2$ is from 0.01 to 0.6% by weight.

By arranging the composition as defined above in the first aspect of the present invention or adding $MnO_2$ to the composition in a specified amount in the second aspect of the present invention, a dielectric porcelain composition having practically acceptable dielectric properties, i,e., $\in_r$ of from 8 to 25, $Q_u$ of from 2,200 to 6,600 and $\tau_f$ of from −85 to +100 ppm/°C. can be obtained. In particular, the dielectric porcelain composition according to the second aspect of the present invention shows no $Q_u$ drop and hence maintains excellent properties even when used in the form of resonator having a larger size. Further, the dielectric porcelain composition can have better dielectric properties, i.e., $\in_r$ of from 11 to 23, $Q_u$ of from 4,000 to 6,600 and $\tau_f$ of from −30 to +30 ppm/°C. as defined in the third aspect of the present invention. Moreover, the dielectric porcelain composition can have a particularly excellent $\tau_f$ value, i.e., from −10 to +10 ppm/°C., and $\in_r$ of from 14 to 22 and $Q_u$ of from 4,200 to 6,500 as defined in the fourth aspect of the present invention.

DETAILED DESCRIPTION OF THE INVENTION

Figure 2:
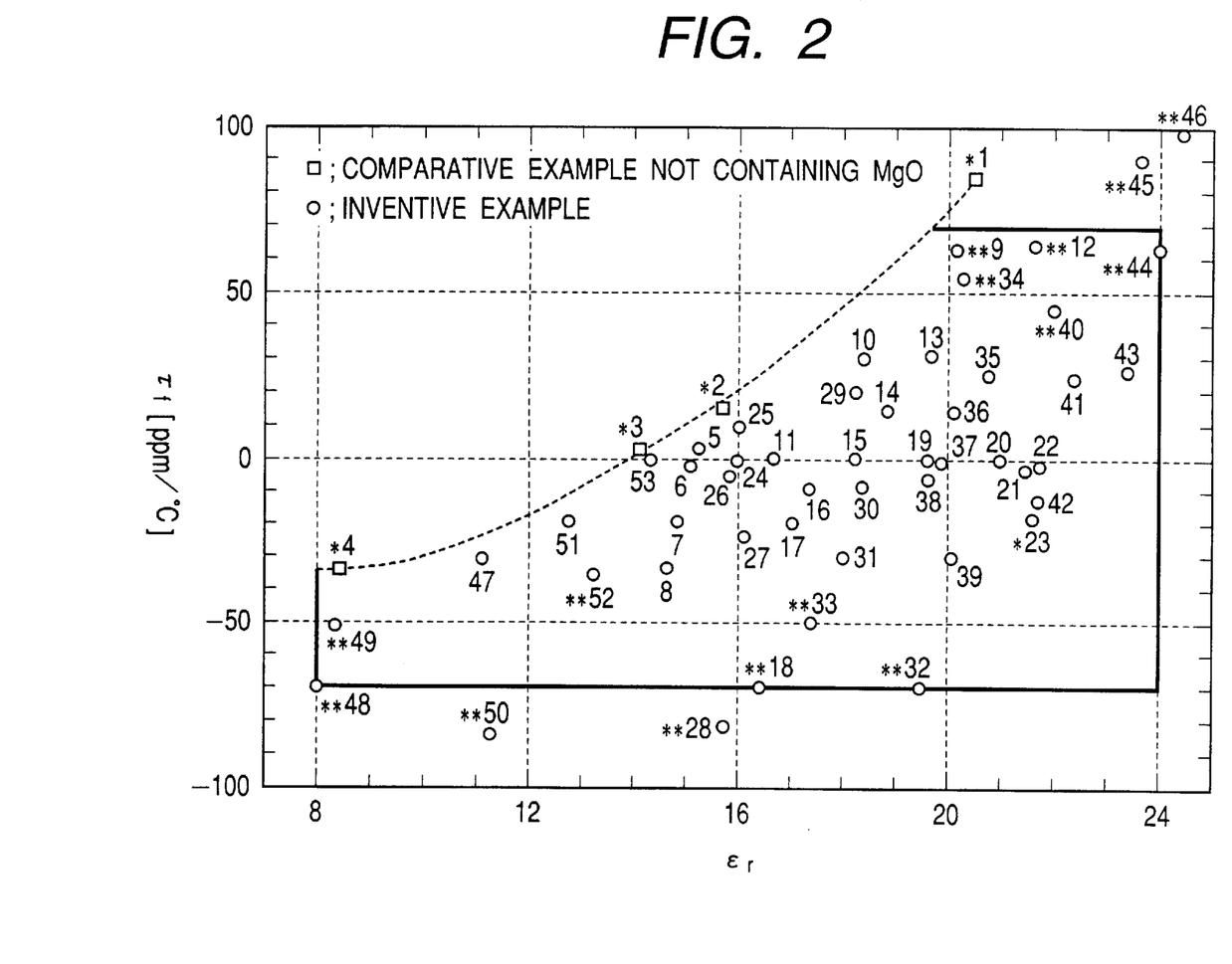
FIG. 2 is a graph illustrating the relationship between $\tau_f$ and $\in_r$ of the dielectric porcelain composition according to the first aspect of the present invention and a comparative dielectric porcelain composition free of MgO.

In the first aspect of the present invention, by properly adjusting the composition while maintaining excellent $Q_u \tau_f$ can be adjusted to a wide range while $\in_r$ falls within a range of from 8 to 24, particularly from 14 to 22, as shown in FIG. 2. Moreover, $\tau_f$ can be controlled to around 0 ppm/°C. while $\in_r$ falls within a range of from 14 to 22. As shown in FIG. 2, Experiment Examples 1 to 4 used no MgO and thus produced dielectric porcelain compositions falling outside the scope of the first aspect of the present invention. These dielectric porcelain compositions can stand comparison with the dielectric porcelain composition according to the first aspect of the present invention in dielectric properties. However, these dielectric porcelain compositions are binary compositions comprising $SnO_2$ and $TiO_2$ and thus show an explicit relationship between $\in_r$ and $\tau_f$. Thus, $\tau_f$ cannot be adjusted to a desired value, particularly around 0 ppm/°C., over a wide range of $\in_r$. In the second aspect of the present invention, too, $\in_r$ and $\tau_f$ can be adjusted to a relatively wide range of value. In particular, $\tau_f$ can be controlled to around 0 ppm/°C. over a specific range of $\in_r$.

In the first aspect of the present invention, the foregoing component "$xTiO_2$-$ySnO_2$-$zMgO$" can be produced by compounding Ti, Sn and Mg in the form of oxide or compound which becomes oxides upon heating such as carbonate, e.g., $TiO_2$, $SnO_2$ and $MgCO_3$, as starting material powders, and then calcining the blend. Further, the dielectric porcelain composition of the present invention can be produced by mixing the foregoing starting material powders and $MnO_2$ or an Mn compound which becomes $MnO_2$ upon heating such as $MnCO_3$, and then calcining the blend.

In the first and second aspects of the present invention, if the foregoing prefix x falls below 2 mol-%, $\in_r$ is low and $\tau_f$ is negatively greater. On the contrary, if x exceeds 63 mol-%, $Q_u$ tends to fall. Further, if the foregoing prefix y falls below 11 mol-%, $Q_u$ shows a great drop. On the contrary, if y exceeds 98 mol-%, $\in_r$ is low. Moreover, if the foregoing prefix z is 0 mol-%, i.e., if there is no MgO content, any of $\in_r$, $Q_u$ and $\tau_f$ is lowered, although the tendency depends on x and y values. On the contrary, if z exceeds 30 mol-%, $Q_u$ tends to fall.

Figure 3:
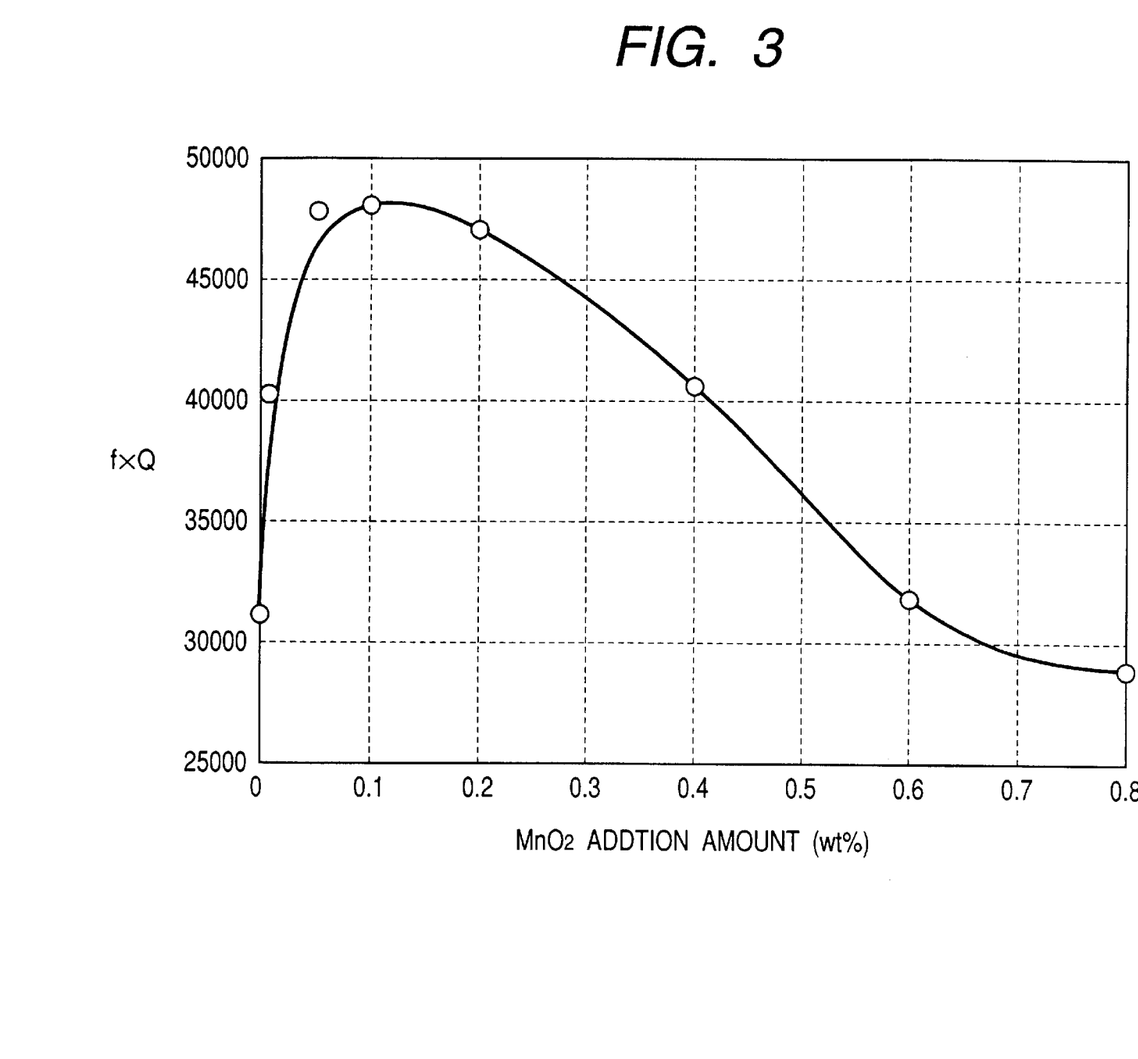
FIG. 3 is a graph illustrating the relationship between $MnO_2$ content and fxQ.

Further, as apparent from FIG. 3, which illustrates the relationship between $MnO_2$ content and f x Q, if the content of $MnO_2$ falls below 0.01% by weight, there is no sufficient enhancement of $Q_u$ as compared with the case where the content of $MnO_2$ is zero. On the contrary, if the content of $MnO_2$ exceeds 0.6% by weight, $Q_u$ shows a drop from the case where the content of $MnO_2$ is zero. The content of $MnO_2$ is preferably from 0.02 to 0.5% by weight, more preferably from 0.03 to 0.4% by weight. If the content of $MnO_2$ falls within this range, a sufficient $Q_u$ value can be maintained even when the dielectric porcelain composition is used in the form of resonator having a larger size.

EXAMPLES

The present invention will be further described in the following examples.

(1) Preparation and Evaluation of Properties of Dielectric Porcelain Composition According to the First Aspect of the Present Invention As starting materials there were used $TiO_2$ powder (purity: 99.95%), $SnO_2$ powder (purity: 99.3%) and $MgCO_3$ powder (purity: 99.5%). These powders were then measured out in predetermined amounts such that x, y and z in $xTiO_2$-$ySnO_2$-$zMgO$ are as set forth in Examples 1 to 17 of Table 1, Examples 18 to 35 of Table 2 and Examples of 36 to 53 of Table 3. In Tables 1 and 2, the symbol * indicates that the dielectric porcelain composition falls outside the scope of the first aspect of the present invention. In Tables 1 to 3, the symbol ** indicates that the dielectric porcelain composition falls outside the scope of the third aspect of the present invention.

TABLE 1

| Experiment Example No. | x: $TiO_2$ | y: $SnO_2$ | z: MgO | $\in_r$ | $Q_x$ | τf | Calcination (° C.) | Sintering (° C.) |
|---|---|---|---|---|---|---|---|---|
| *1 | 20.0 | 80.0 | 0 | 20.50 | 3,530 | 85.00 | 1050 | 1375 |
| *2 | 12.0 | 88.0 | 0 | 15.63 | 4,321 | 13.72 | 1100 | 1400 |
| *3 | 10.0 | 90.0 | 0 | 14.00 | 5,040 | 1.20 | 1050 | 1375 |
| *4 | 5.0 | 95.0 | 0 | 8.50 | 4,880 | -32.00 | 1050 | 1375 |
| — | 0 | 100 | 0 | Not sintered | Not sintered | Not sintered | 1050 | 1400 |
| 5 | 12.7 | 86.3 | 1.0 | 15.33 | 5,961 | 2.51 | 950 | 1375 |
| 6 | 13.5 | 84.6 | 1.9 | 15.03 | 6,411 | -1.89 | 1000 | 1350 |
| 7 | 15.5 | 80.0 | 4.5 | 14.62 | 6,505 | -17.25 | 900 | 1350 |
| 8 | 18.4 | 73.3 | 8.3 | 14.50 | 6,326 | -29.89 | 950 | 1375 |
| **9 | 20.6 | 78.4 | 1.0 | 20.17 | 3,769 | 65.54 | 1050 | 1425 |
| 10 | 22.7 | 72.7 | 4.6 | 18.43 | 4,749 | 28.50 | 1000 | 1400 |
| 11 | 25.0 | 66.7 | 8.3 | 16.52 | 5,648 | 0.56 | 1050 | 1350 |
| **12 | 33.3 | 58.3 | 8.4 | 21.73 | 3,790 | 67.12 | 900 | 1350 |
| 13 | 34.6 | 53.9 | 11.5 | 19.66 | 4,564 | 29.98 | 900 | 1350 |
| 14 | 35.2 | 51.8 | 13.0 | 18.89 | 4,998 | 14.53 | 950 | 1375 |
| 15 | 35.7 | 50.0 | 14.3 | 18.11 | 5,381 | 1.38 | 950 | 1375 |
| 16 | 36.2 | 48.3 | 15.5 | 17.43 | 5,834 | -9.69 | 950 | 1375 |
| 17 | 36.6 | 46.7 | 16.7 | 16.98 | 5,753 | -20.35 | 900 | 1350 |

TABLE 2

| Experiment Example No. | x: TiO$_2$ | y: SnO$_2$ | z: MgO | $\epsilon_r$ | Q$_x$ | τf | Calcination (° C.) | Sintering (° C.) |
|---|---|---|---|---|---|---|---|---|
| **18 | 37.5 | 43.7 | 18.8 | 16.22 | 3,730 | −68.81 | 900 | 1350 |
| 19 | 43.7 | 37.5 | 18.8 | 19.67 | 5,124 | 0.70 | 950 | 1375 |
| 20 | 50.0 | 27.8 | 22.2 | 20.88 | 4,899 | 1.40 | 950 | 1375 |
| 21 | 55.0 | 20.0 | 25.0 | 21.61 | 4,725 | −3.33 | 900 | 1350 |
| 22 | 59.1 | 13.6 | 27.3 | 21.88 | 4,223 | −2.73 | 900 | 1350 |
| *23 | 63.0 | 8.3 | 28.7 | 21.53 | 1,206 | −19.60 | 900 | 1350 |
| 24 | 21.0 | 72.5 | 6.5 | 15.91 | 5,701 | −0.50 | 950 | 1375 |
| 25 | 18.5 | 77.5 | 4.0 | 16.02 | 5,023 | 8.14 | 950 | 1375 |
| 26 | 22.5 | 70.0 | 7.5 | 15.84 | 5,918 | −6.55 | 950 | 1375 |
| 27 | 29.0 | 58.0 | 13.0 | 16.10 | 6,005 | −26.40 | 900 | 1350 |
| **28 | 38.5 | 40.5 | 21.0 | 15.72 | 2,263 | −82.05 | 900 | 1350 |
| 29 | 30.0 | 60.0 | 10.0 | 18.22 | 4,811 | 20.43 | 950 | 1375 |
| 30 | 39.5 | 43.5 | 17.0 | 18.18 | 5,618 | −8.99 | 950 | 1375 |
| 31 | 46.0 | 32.0 | 22.0 | 17.95 | 5,232 | −28.35 | 900 | 1350 |
| **32 | 53.6 | 18.9 | 27.5 | 19.46 | 3,170 | −69.20 | 900 | 1350 |
| **33 | 46.5 | 30.0 | 23.5 | 17.20 | 4,876 | −48.81 | 900 | 1350 |
| **34 | 25.5 | 70.0 | 4.5 | 20.31 | 4,148 | 55.52 | 1000 | 1400 |
| 35 | 39.5 | 45.0 | 15.5 | 20.66 | 4,359 | 24.76 | 950 | 1375 |

TABLE 3

| Experiment Example No. | x: TiO$_2$ | y: SnO$_2$ | z: MgO | $\epsilon_r$ | Q$_x$ | τf | Calcination (° C.) | Sintering (° C.) |
|---|---|---|---|---|---|---|---|---|
| 36 | 42.5 | 40.0 | 17.5 | 20.08 | 4,721 | 13.29 | 950 | 1375 |
| 37 | 45.5 | 34.5 | 20.0 | 19.99 | 5,183 | −1.20 | 950 | 1375 |
| 38 | 47.5 | 31.0 | 21.5 | 19.85 | 5,254 | −7.64 | 900 | 1350 |
| 39 | 53.5 | 20.5 | 26.0 | 20.23 | 4,786 | −30.00 | 900 | 1350 |
| **40 | 42.5 | 42.5 | 15.0 | 21.95 | 4,029 | 46.13 | 950 | 1375 |
| 41 | 52.5 | 25.0 | 22.5 | 22.03 | 4,187 | 23.68 | 900 | 1350 |
| 42 | 59.5 | 12.5 | 28.0 | 21.68 | 4,615 | −15.16 | 950 | 1375 |
| 43 | 59.5 | 14.0 | 26.5 | 23.01 | 4,000 | 28.95 | 900 | 1350 |
| **44 | 54.0 | 24.8 | 21.2 | 24.01 | 3,545 | 65.40 | 900 | 1350 |
| **45 | 45.0 | 40.0 | 15.0 | 23.68 | 2,839 | 82.08 | 950 | 1375 |
| **46 | 57.5 | 20.0 | 22.5 | 24.49 | 2,442 | 98.56 | 900 | 1350 |
| 47 | 9.0 | 87.5 | 3.5 | 11.12. | 5,483 | −27.98 | 950 | 1375 |
| **48 | 5.0 | 90.0 | 5.0 | 8.04 | 4,221 | −68.73 | 1100 | 1450 |
| **49 | 5.0 | 92.5 | 2.5 | 8.26 | 5,111 | −51.23 | 1100 | 1450 |
| **50 | 12.5 | 78.0 | 9.5 | 11.13 | 3,538 | −84.63 | 1000 | 1400 |
| 51 | 10.5 | 87.0 | 2.5 | 12.58 | 5,861 | −18.43 | 950 | 1375 |
| **52 | 15.0 | 77.5 | 7.5 | 13.34 | 6,159 | −35.22 | 1000 | 1400 |
| 53 | 10.0 | 89.9 | 0.1 | 14.08 | 5,416 | 0.50 | 1000 | 1400 |

Thereafter, the predetermined amount of the various powders were dry-mixed in a mixer for 20 to 30 minutes. The powder mixture thus obtained was then subjected to primary grinding by means of an oscillating mill. As pebble there was used an alumina ball. The grinding time was 4 hours. Subsequently, the powder thus obtained was calcinated at a temperature of from 900° C. to 1,100° C. under atmospheric conditions for 2 hours. To the powder thus calcinated were then added a proper amount of an organic binder and water. The mixture was then subjected to secondary grinding by means of a Trommel mill. Thereafter, the powder thus secondarily ground was dried by a spray dryer, and then granulated. The material thus granulated was then sifted to obtain a powder having a grain size of from 40 to 200 meshes. The powder thus obtained was pressed to prepare a columnar molded product having a diameter of 19 mm and a thickness of 11 mm. The pressing pressure was 3 tons and the molding pressure was 1 ton/cm$^2$.

The molded product thus obtained was degreased, and then calcined at a temperature of from 1,350° C. to 1,450° C. for 6 hours. The sintered product thus obtained was then ground on the periphery and both ends thereof to obtain a columnar sintered product having a diameter of 16 mm and a thickness of 8 mm. The columnar sintered product was then measured as a specimen for $\epsilon_r$, Q$_u$ and $\tau_f$ by the Hakki and Coleman method (See Denesh C. Dube, Rudolf Zurmuhien, Andrew Bell and Nava setter, "Dielectric Measurements on High-Q ceramics in the Microwave Region" *J. Am. Ceram. Soc.,* 80[5] 1095–1100 (TE$_{011}$ mode).

$\tau_f$ was measured at a temperature of from 25° C. to 80° C. $\tau_f$ was then calculated from the equation $\tau_f=(f_{80}-f_{25})/(f_{25} \times \Delta T)$ wherein $\Delta T$ is 55° C. (80–25). During the measurement, resonance frequency was from 5 to 8 GHz. The results of $\epsilon_r$, Q$_u$ and $\tau_f$ are together set forth in Tables 1 to 3.

The results set forth in Tables 1 to 3 show that Experiment Examples 5 to 22 and 24 to 53 according to the first aspect of the present invention exhibit $\in_r$ of from 8.04 to 24.49, $Q_u$ of from 2,263 to 6,505 and $\tau_f$ of from −84.63 to +98.56 ppm/°C., demonstrating that these experiment examples provide a dielectric porcelain composition having practically acceptable dielectric properties. In particular, it can be seen that Experiment Examples 5 to 8, 10, 11, 13 to 17, 19 to 22, 24 to 27, 29 to 31, 35 to 39, 41 to 43, 47, 51 and 53 according to the third aspect of the present invention exhibit $\in_r$ of from 11.12 to 23.01, $Q_u$ of from 4,000 to 6,505 and $\tau_f$ of from −30.00 to +29.98 ppm/°C., demonstrating that these experiment examples provide a dielectric porcelain composition having better dielectric properties.

It can further been seen that Experiment Examples 5, 6, 11, 15, 16, 19 to 22, 24 to 26, 30, 37 to 38 and 53 according to the fourth aspect of the present invention exhibit $\in_r$ of from 14.08 to 21.88, $Q_u$ of from 4,223 to 6,411 and $\tau_f$ of from −9.69 to +8.14 ppm/°C., demonstrating that these experiment examples provide a dielectric porcelain composition having better dielectric properties than the third aspect of the present invention. In particular, it can been seen that Experiment Examples 5, 6, 11, 15, 19, 20, 22, 24, 37 and 53 provide a dielectric porcelain composition having a very excellent $\tau_f$ value around 0 ppm/°C., i.e., from −2.73 to +2.51 ppm/°C.

On the other hand, Experiment Examples 1 to 4, free of MgO, are not particularly poor in each of $\in_r$, $Q_u$ and $\tau_f$ but show an explicit relationship between $\in_r$ and $\tau_f$ depending on the proportion of $SnO_2$, demonstrating that these properties cannot be properly adjusted. Further, Experiment Example 23, which comprises SnO2 in a content falling outside the scope of the first aspect of the present invention, exhibits practically acceptable $\in_r$ and $\tau_f$ values but shows a drastic $Q_u$ drop, demonstrating that the dielectric porcelain composition cannot be put into practical use. If x and z each are 0 mol-%, i.e., the dielectric porcelain composition is made of $SnO_2$ alone free of $TiO_2$ and MgO, the resulting composition exhibits a deteriorated sinterability that makes it impossible to obtain a sintered product.

Figure 4:
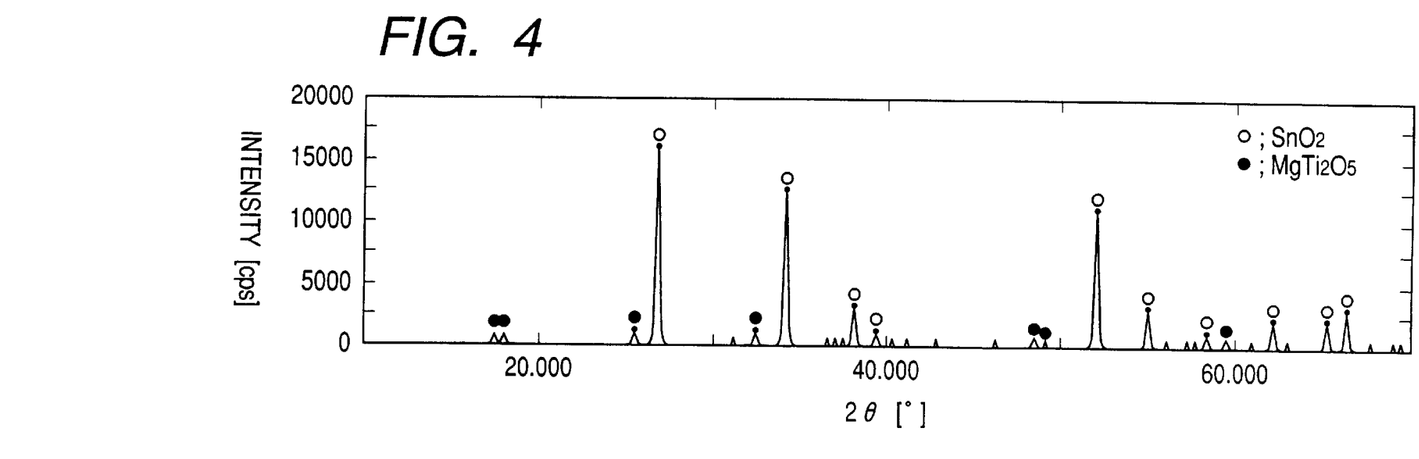
FIG. 4 is an x-ray diffraction chart of the dielectric porcelain composition of Experiment Example 11.
Figure 5:
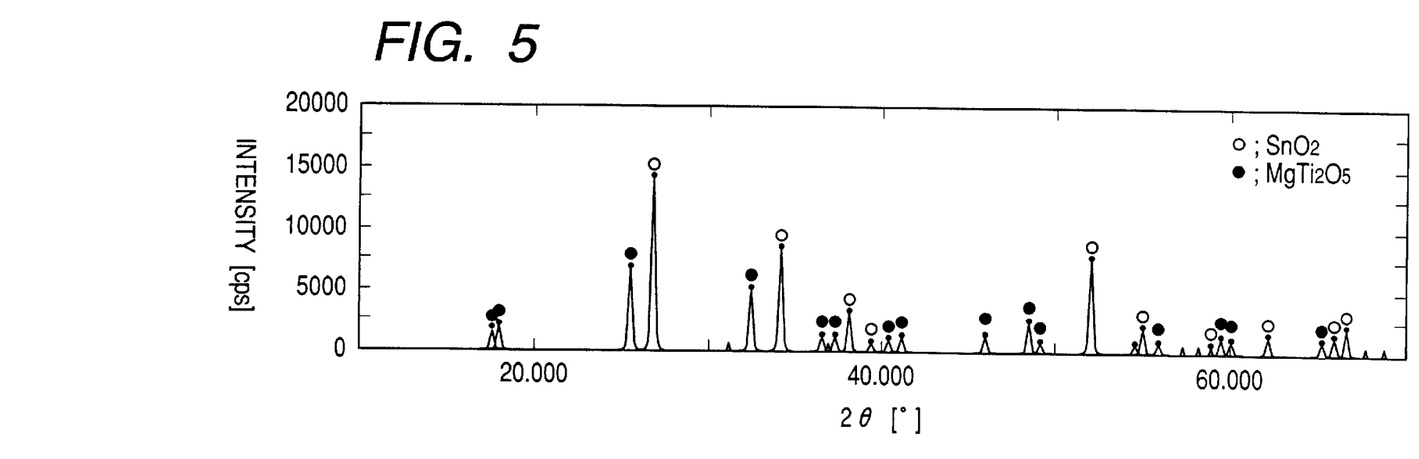
FIG. 5 is an x-ray diffraction chart of the dielectric porcelain composition of Experiment Example 20.

FIGS. 4 and 5 are charts illustrating x-ray diffraction of the dielectric porcelain compositions of Experiment Examples 11 and 20, respectively. The results show that these compositions are made of $SnO_2$ and $MgTi_2O_5$, which is a composite oxide.

(2) Preparation and Evaluation of Properties of Dielectric Porcelain Composition According to the Second Aspect of the Present Invention The procedure of the process (1) was followed except that $MnO_2$ was added to the starting materials of Experiment Example 11 in an amount of 0.1% by weight to obtain sintered products. However, these sintered products were in the form of column having an outer diameter (a) of 16 mm and a thickness (c) of 9 mm (Experiment Example 54), column having an outer diameter (a) of 23 mm and a thickness (c) of 22 mm (Experiment Example 55) or cylinder having an outer diameter (a) of 45 mm, an inner diameter (b) of 12 mm and a thickness (c) of 21 mm (Experiment Example 56). In Experiment Examples 57 to 59, on the other hand, the same starting materials as used in Experiment Example 11 were used to prepare sintered products having different dimensions as mentioned above.

These sintered products were each ground to prepare a sample having a diameter of 16 mm and a thickness of 8 mm. These samples were then measured for $\in_r$, $Q_u$ and $\tau_f$ in the same manner as in the process (1). In these experiment examples, $Q_u$ was measured also in $TE_{01\delta}$ mode. The resonance frequency (f) at which $Q_u$ is measured was varied somewhat every measurement. As an accurate index of dielectric loss there was used f x Q in $TE_{01\delta}$ mode. The results are set forth in Table 4.

TABLE 4

| Example No. | Dimension of sintered product (mm) | | | Added amount of $MnO_2$ (wt-%) | f × Q (GHz) $TE_{01\delta}$ mode | $\epsilon_r$ | $Q_u$ $TE_{011}$ mode | $\tau f$ (ppm/° C.) | Calcination (° C.) | Sintering (° C.) |
|---|---|---|---|---|---|---|---|---|---|---|
| | Outer diameter (a) | Inner diameter (b) | Thickness (c) | | | | | | | |
| 54 | 16 | — | 9 | 0.1 | — | 16.63 | 5,721 | −1.59 | 1050 | 1350 |
| 55 | 23 | — | 22 | | 76,239 | 16.45 | 5,636 | −2.34 | 1050 | 1350 |
| 56 | 45 | 12 | 21 | | 48,128 | 16.57 | 5,573 | −2.07 | 1050 | 1350 |
| 57 | 16 | — | 9 | — | — | 16.52 | 5,648 | 0.56 | 1050 | 1350 |
| 58 | 23 | — | 22 | | 57,666 | 16.28 | 4,700 | 0.73 | 1050 | 1350 |
| 59 | 45 | 12 | 21 | | 31,103 | 16.32 | 4,100 | 0.49 | 1050 | 1350 |

The results set forth in Table 4 show that even the sintered products of Experiment Examples 55 and 56 among those comprising a small amount of $MnO_2$ of Experiment Examples 54 to 56 exhibit little or no drop of $\in_r$, $Q_u$ and $\tau_f$ as compared with the sintered product of Experiment Example 54. On the other hand, the sintered products of Experiment Examples 58 and 59 free of $MnO_2$ having a large dimension exhibit no drop of $\in_r$ and $\tau_f$ but show a drastic drop of $Q_u$. It can be also seen that Experiment Examples 58 and 59 exhibit a far lower f x Q in $TE_{01\delta}$ mode than Experiment Examples 55 and 56. These results prove that the drop of $Q_u$ of sintered product can be suppressed by the incorporation of $MnO_2$ even if the dimension of the sintered product has a greater dimension.

(3) Preparation and Evaluation of Properties of Dielectric Resonator Comprising Dielectric Porcelain Composition According to the First and Second Aspect of the Present Invention Experiment Example 60 was prepared in the same manner as in Experiment Examples 56 and 59 except for using the starting materials of Experimental Example 23, so as to be in the form of cylinder having an outer diameter (a) of 45 mm, an inner diameter (b) of 12 mm and a thickness (c) of 21 mm.

Figure 6:
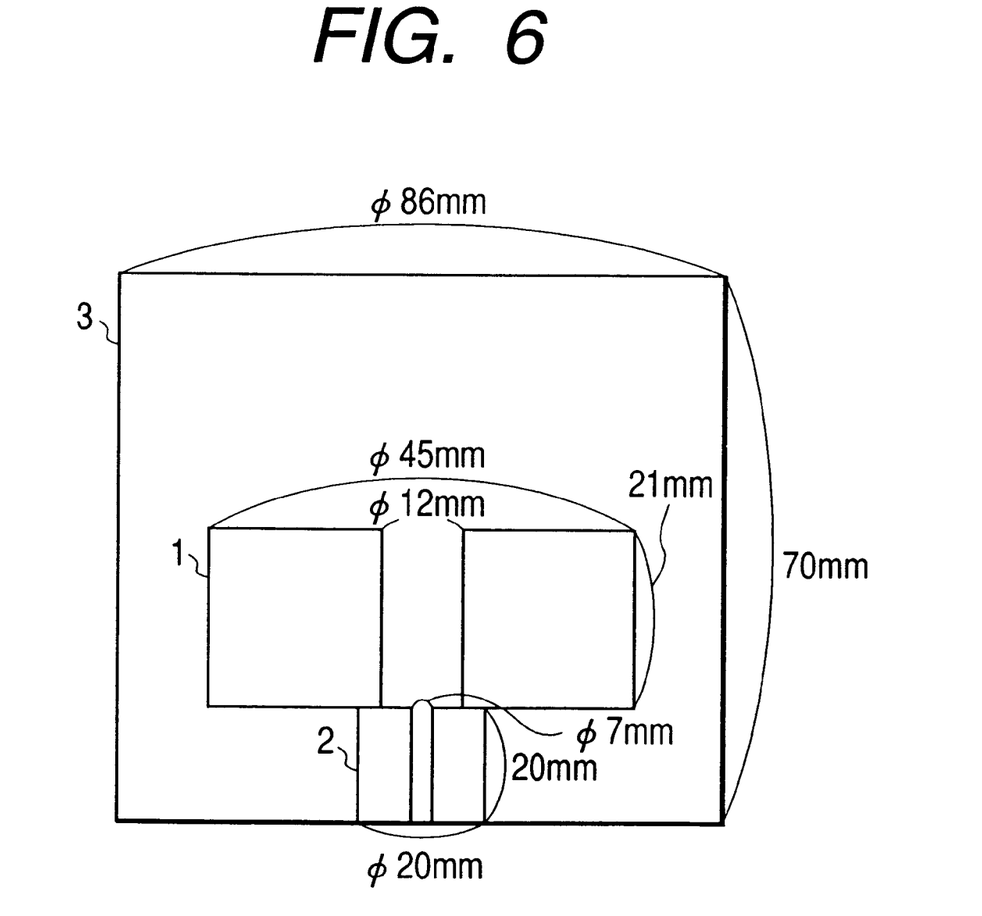
FIG. 6 illustrates an example of a dielectric resonator comprising a resonator body and a supporting member.

FIG. 6 illustrates an example of a dielectric resonator comprising a resonator body 1 and a supporting member 2. The reference numeral 3 represents a metal casing 3.

Alumina in the form of cylinder having an outer diameter (a) of 20 mm, an inner diameter (b) of 7 mm and a thickness (c) of 20 mm was used as a supporting member.

Experiment Examples 56, 59 and 60 were used as a resonator body.

Steel in the form of cylinder having a diameter having a diameter of 86 mm and a height of 70 mm was used as a metal casing.

These samples were then measured for $\tau_f$ in the same manner as in the process (1). In these experiment examples, $Q_u$ was measured also in $TE_{01\delta}$ mode. The resonance frequency (f) at which $Q_u$ is measured was varied somewhat every measurement. As an accurate index of dielectric loss there was used f x Q in $TE_{01\delta}$ mode. The results are set forth in Table 5.

TABLE 5

| Example No. | f x Q (GHZ) $TE_{01\delta}$ mode | $\tau_f$ (ppm/° C.) |
|---|---|---|
| 56 | 48,128 | −2.07 |
| 59 | 31,103 | 0.49 |
| 60 | 6,679 | −19.75 |

As is clear from the results of Table 5, the dielectric resonator using the present microwave dielectric porcelain composition shows excellent properties.

The present invention is not limited to the foregoing specific embodiments. Widely different embodiments of the present invention may be made without departing from the scope thereof depending on the purpose and use. For example, as MgO material there may be used peroxide, hydroxide or nitrate of Mg besides $MgCO_3$. Similarly, as other oxide materials there may be used various compounds which become oxides upon heating.

In accordance with the first and second aspects of the present invention, a dielectric porcelain composition having practically acceptable dielectric properties can be obtained. In particular, the third and fourth aspects of the present invention can provide a dielectric porcelain composition having a higher $\in_r$ value and a higher $Q_u$ value and a small absolute $\tau_f$ value. Further, the dielectric porcelain composition can have a desired $\tau_f$ value over a wide $\in_r$ range. In particular, the dielectric porcelain composition can have an very excellent $\tau_f$ value, i.e., around 0 ppm/°C. Moreover, the dielectric porcelain composition according to the second aspect of the present invention can inherently maintain a sufficient Qu value even when used in the form of resonator having a larger size.

What is claimed is:

1. A microwave dielectric porcelain composition having a composition represented by the formula $xTiO_2$-$ySnO_2$-$zMgO$, wherein x, y and z each represents an axis of mol-% in a triangular diagram, the sum of x, y and z being 100 mol-%, a pentagonal region is formed by sequentially connecting points P (x=59, y=11, z=30), Q (x=63, y=11, z=26), R (x=22.5, y=77.5, z=0), S (x=2, y=98, z=0), T (x=4, y=90, z=6) and P, and the formula is defined to be within the PQ, QR, ST and TP sides, but not defined by the RS side, of the pentagonal region.

2. The microwave dielectric porcelain composition according to claim 1, which has a dielectric constant of from 11 to 23, an unloaded Q value of from 4,000 to 6,600 and a resonance frequency temperature coefficient of from −30 to +30 ppm/°C.

3. The microwave dielectric porcelain composition according to claim 1, which has a dielectric constant of from 14 to 22, an unloaded Q value of from 4,200 to 6,500 and a resonance frequency temperature coefficient of from −10 to +10 ppm/°C.

4. The microwave dielectric porcelain composition according to claim 1, containing MgO in a amount of 1.0 mol % or more.

5. A microwave dielectric porcelain composition comprising a component represented by the formula $xTiO_2$-$ySnO_2$-$zMgO$, wherein x, y and z each represents an axis of mol-% in a triangular diagram, the sum of x, y and z being 100 mol-%, a pentagonal region is formed by sequentially connecting points P (x=59, y=11, z=30), Q (x=63, y=11, z=26), R (x=22.5, y=77.5, z=0), S (x=2, y=98, z=0), T (x=4, y=90, z=6) and P, the formula is defined to be within the PQ, QR, ST and TP sides, but not defined by the RS side, of the pentagonal region, and the microwave dielectric porcelain composition further comprises $MnO_2$ in an amount of 0.01 to 0.6% by weight based on the component represented by the formula $xTiO_2$-$ySnO_2$-$zMgO$.

6. The microwave dielectric porcelain composition according to claim 5, which has a dielectric constant of from 11 to 23, an unloaded Q value of from 4,000 to 6,600 and a resonance frequency temperature coefficient of from −30 to +30 ppm/°C.

7. The microwave dielectric porcelain composition according to claim 5, which has a dielectric constant of from 14 to 22, an unloaded Q value of from 4,200 to 6,500 and a resonance frequency temperature coefficient of from −10 to +10 ppm/°C.

8. A dielectric resonator comprising a supporting member and a resonator body comprising a microwave dielectric porcelain composition having a composition represented by the formula $xTiO_2$-$ySnO_2$-$zMgO$, wherein x, y and z each represents an axis of mol-% in a triangular diagram, the sum of x, y and z being 100 mol-%, a pentagonal region is formed by sequentially connecting points P (x=59, y=11, z=30), Q (x=63, y=11, z=26), R (x=22.5, y=77.5, z=0), S (x=2, y=98, z=0), T (x=4, y=90, z=6) and P, and the formula is defined to be within the PQ, QR, ST and TP sides, but not defined by the RS side, of the pentagonal region.

9. A dielectric resonator comprising a resonator body and a supporting member, wherein the resonator body comprising a microwave dielectric porcelain composition comprising a component represented by the formula $xTiO_2$-$ySnO_2$-$zMgO$, wherein x, y and z each represents an axis of mol-% in a triangular diagram, the sum of x, y and z being 100 mol-%, a pentagonal region is formed by sequentially connecting points P (x=59, y=11, z=30), Q (x=63, y=11, z=26), R (x=22.5, y=77.5, z=0), S (x=2, y=98, z=0), T (x=4, y=90, z=6) and P, the formula is defined to be within the PQ, QR, ST and TP sides, but not defined by the RS side, of the pentagonal region, and the microwave dielectric porcelain composition further comprises $MnO_2$ in an amount of 0.01 to 0.6% by weight based on the component represented by the formula $xTiO_2$-$ySnO_2$-$zMgO$.

10. The dielectric resonator comprising a resonator body and a supporting member according to claim 9, wherein the microwave dielectric porcelain composition contains MgO in an amount of 1.0 mol % or more.

11. A microwave dielectric porcelain composition having a composition represented by the formula $xTiO_2$-$ySnO_2$-$zMgO$, wherein x, y and z each represents an axis of mol-% in a triangular diagram, the sum of x, y and z being 100 mol-%, a pentagonal region is formed by sequentially connecting points P (x=59, y=11; z=30), Q (x=63, y=11, z=26), R(x=22.5, y=77.5, z=1), S (x=2, y=98, z=1), T (x=4, y=90, z=6) and P, and the formula is defined to be within the PQ, QR, ST and TP sides.

12. A dielectric resonator comprising a supporting member and a resonator body comprising a microwave dielectric porcelain composition having a composition represented by the formula $xTiO_2$-$ySnO_2$-$zMgO$, wherein x, y and z each represents an axis of mol-% in a triangular diagram, the sum of x, y and z being 100 mol-%, a pentagonal region is formed by sequentially connecting points P (x=59, y=11; z=30), Q (x=63, y=11, z=26), R (x=22.5, y=77.5, Z=1), S (x=2, y=98, z=1), T (x=4, y=90, z=6) and P, and the formula is defined to be within the PQ, QR, ST and TP sides.

* * * * *